(12) United States Patent
Wright

(10) Patent No.: US 7,835,697 B2
(45) Date of Patent: Nov. 16, 2010

(54) FREQUENCY AGILE RADIO SYSTEM AND METHOD

(75) Inventor: David Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 900 days.

(21) Appl. No.: 11/375,852

(22) Filed: Mar. 14, 2006

(65) Prior Publication Data

US 2007/0218841 A1 Sep. 20, 2007

(51) Int. Cl.
*H04B 15/00* (2006.01)
*H04K 3/00* (2006.01)
(52) U.S. Cl. .................... 455/62; 455/63.1; 455/67.13; 455/451; 370/445
(58) Field of Classification Search ............ 455/62, 455/63.1–63.3, 67.13, 451, 452.1; 370/445, 370/447
See application file for complete search history.

(56) References Cited

U.S. PATENT DOCUMENTS

| 5,260,944 | A | * | 11/1993 | Tomabechi | 370/347 |
|---|---|---|---|---|---|
| 5,661,724 | A | * | 8/1997 | Chennakeshu et al. | 370/324 |
| 5,668,828 | A |  | 9/1997 | Sanderford, Jr. et al. |  |
| 6,101,176 | A | * | 8/2000 | Honkasalo et al. | 370/335 |
| 7,023,832 | B2 | * | 4/2006 | Ragan et al. | 370/345 |
| 2002/0071407 | A1 | * | 6/2002 | Koo et al. | 370/335 |

OTHER PUBLICATIONS

International Search Report for International Application No. PCT/US07/61615 dated Dec. 3, 2007; 2 pages.
The Written Opinion of the International Searching Authority for International Application No. PCT/US07/61615 dated Dec. 3, 2007; 4 pages.

* cited by examiner

*Primary Examiner*—Lee Nguyen (57) ABSTRACT

This invention provides a method for improved frequency agility and preferably includes transmitting and receiving data on a primary channel; finding a secondary channel substantially free from interference during a period between data transmissions on the primary channel; and transmitting and receiving data on the secondary channel when an unacceptable level of interference is detected on the primary channel. In an alternate embodiment, data is preferably transmitted on a primary and a secondary channel during separate periods of a transmission interval. If an unacceptable level of interference is detected on either the primary or secondary channels, then the other channel is used for data transmission during one of the periods while another one of the periods is used to identify a new channel substantially free from interference to replace the bad channel.

18 Claims, 5 Drawing Sheets

FIG. 4C

FREQUENCY AGILE RADIO SYSTEM AND METHOD

TECHNICAL FIELD

This invention relates generally to frequency agile radio systems and, in particular, to an improved method of reducing interruptions of service during when changing channels in frequency agile radio systems.

BACKGROUND OF THE INVENTION

Radio Frequency (RF) systems have conventionally employed one or more several means of avoiding interference with other such systems. The most common is broadcast radio, where each broadcaster is allocated exclusive use of a single radio frequency channel and no other transmitters are permitted on that allocated channel. However, in systems using unlicensed radio spectrum, more sophisticated means are often required because no user has exclusive rights to any given frequency. Examples of these methods include Frequency Hopping Spread Spectrum (FHSS), Carrier Sense Multiple Access (CSMA), Time Division Multiple Access (TDMA), Transmit at Will with Retry, and Direct Sequence Spread Spectrum (DSSS).

In FHSS systems, transmitters and receivers "hop" between different radio frequencies in a pre-defined sequence. Such systems have the advantage of almost always being able achieve successful reception of at least some of the transmitted packets, because it is very rare for all of the different frequencies used to be blocked by other radio transmitters. However, they have the disadvantage that frequently at least some of the transmitted packets will not be received if there are other radio systems operating in the same band.

In CSMA systems, a transmitter "listens" for "quiet" on the frequency channel in use before transmitting. In systems where the packet transmission rate is low, CSMA systems have a high probability of receiving transmitted packets. Many CSMA systems are fixed channel systems, but some also use Frequency Agility (described below). A disadvantage of CSMA is that it is generally unsuitable for low-latency systems, as the delay between when a device has data ready to transmit and when the channel is quiet is uncertain.

In TDMA systems, multiple systems may share a single frequency channel, or a single system comprising many transmitters may use the same channel. In a TDMA system, one or more "coordinators" must manage timing for the whole system or group of systems, allocating time slices to each of the other nodes in the system or systems. In this way, each transmitter has an allocated time slice and has exclusive use of the channel during its allocated time slice.

Transmit at Will with Retry systems take a much simpler approach. A transmitter sends its packet whenever data is ready to send. If the data is correctly received, the receiver transmits back a handshake signal. If the transmitter does not receive the handshake signal, it will retransmit the original data packet. By using random backoff times between retransmissions, Transmit at Will with Retry systems can support multiple transmitters. If two (or more) transmitters try to send data at the same time, no packets will be received by the receiver, so no handshake signals will be sent. Both transmitters will then retransmit later, but at different times. DSSS transmission can be combined with this method to improve resistance to packet corruption caused by other RF systems using the same channel and other sources of RF interference.

In DSSS systems, the signal does not hop from one frequency to another but is passed through a spreading function in the transmitter and distributed over a bandwidth greater than the bandwidth of the data rate. In some cases, the entire band may be used to transmit a single channel of data, but, more typically, the band is split into a number of channels each wider than the data rate. A DSSS receiver passes the received signal through a dispreading function, which concentrates the spread transmitted signal and spreads any narrowband interference on the channel. In this way, a DSSS receiver avoids interference by concentrating the desired signal but spreading out and diluting any interfering signal.

Apart from frequency hopping, all of the above methods must have a channel selection method. The simplest such method is for the system to be configured to use a single channel when installed. However, many radio systems use frequency bands where the use of the different channels may vary dynamically. For example, in the 2.4 GHz band, an already present wireless networking (e.g., 802.11) system may not be in use at the time of installation but may later interfere badly when it is in use. Therefore, many such systems employ Frequency Agility.

In a frequency agile system, when persistent interference is detected on the channel currently in use, the system changes to use a different channel with minimal interference. However, one drawback of the conventional implementation of frequency agile systems is that there can be a significant delay in finding a new channel that is free from interference. This delay may result in an interruption of service for tens of milliseconds (ms) or longer.

Thus, an improved frequency agile radio system in which the interruption of service during channel changing is dramatically lower than in conventional systems is desirable.

SUMMARY OF THE INVENTION

One method of improved frequency agility comprises transmitting and receiving data on a primary channel, and finding a secondary channel free from interference using the time between data transmissions on the primary channel. When an unacceptable level of interference is detected on the primary channel, the method preferably comprises switching to the secondary channel for transmitting and receiving data.

In another embodiment, the method of improved frequency agility comprises operating on both primary and secondary channels. This method preferably comprises transmitting data packets on the primary channel during a first period of a data transmission interval and re-transmitting the same data packets on the secondary channel during a second period of the data transmission interval. When an unacceptable level of interference is detected on one of the primary or secondary channels, this method preferably maintains operations on the "quiet" one of the primary or secondary channels during one of the periods of the data transmission interval and finds another channel free from interference during the other one of the periods of the data transmission interval to replace the "noisy" channel.

BRIEF DESCRIPTION OF THE DRAWINGS

The above and other features and advantages of various embodiments of the invention will become readily apparent through the following detailed description when considered in with reference to the accompanying drawings, in which.

DETAILED DESCRIPTION

As will be apparent to those skilled in the art from the following disclosure, the invention as described herein may be embodied in many different forms and should not be construed as limited to the specific embodiments set forth herein. Rather, these embodiments are provided so that this disclosure will fully convey the principles and scope of the invention to those skilled in the art.

Figure 1:
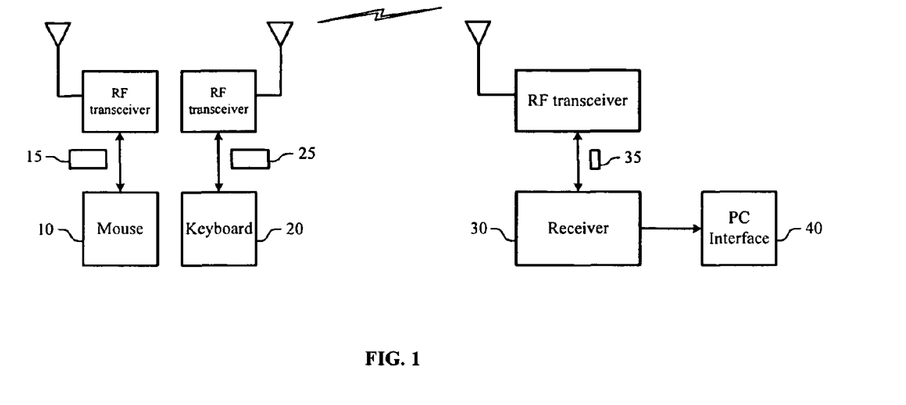
FIG. 1 is a schematic block diagram of a wireless keyboard and mouse system.

FIG. 1 is a block diagram of a wireless keyboard and mouse system 100. The system 100 may comprise a mouse 10, a keyboard 20, and a receiver 30. The receiver 30 receives data packets 15, 25 from the mouse 10 and the keyboard 20, wherein the data packets 15, 25 contain information about mouse movements and keystrokes. The receiver 30 then communicates this information to a connected computer system through an interface 40 (for example, a USB port) on the computer.

The mouse 10 does not transmit when the mouse 10 is not moving, and the keyboard 20 does not transmit when no key is pressed. When the mouse 10 is moving, it typically transmits a packet 15 once every 10 ms. When a key is pressed on the keyboard 20, a packet 25 is typically transmitted every 50 ms or immediately on any change in the state of the keys on the keyboard 20.

When the receiver 30 receives a packet 15, 25 from the mouse 10 or keyboard 20, it sends a handshake or ACK response packet 35 to the keyboard 20 or the mouse 10. If the keyboard 20 or the mouse 10 sends a packet 15, 25 but does not receive an ACK packet 35 in response, the keyboard 20 or the mouse 10 retransmits the original packet 15, 25 after a short delay. This delay is shorter for the mouse 10 than the keyboard 20, in order to give priority to mouse packets 15. A typical time required to transmit a data packet 15, 25 and to receive the resulting ACK packet 35 is 1 ms.

For various reasons, the mouse and keyboard packets 15, 25 may not be received correctly. In some cases, keys on the keyboard 20 may be pressed at the same time the mouse 10 is moving. Thus, there is a small probability of a keyboard packet 25 overlapping a mouse packet 15. The probability of a collision occurring for any given mouse packet is approximately 2%, since the keyboard 20 sends a 1 ms packet every 50 ms. When the keyboard packets 25 and the mouse packets 15 overlap, the packets will interfere with each other. Therefore, neither packet 15, 25 will be received correctly by the receiver 30, and the receiver 30 will not transmit an ACK packet 35 to either transmission. The mouse 10 and the keyboard 20 then retransmit the original packets after a short delay. In one example, the mouse 10 may wait 1 ms before retransmitting and the keyboard 20 may wait 3 ms. Therefore, after the "collision," the mouse 10 will retransmit its packet 1 ms later and receive an ACK packet 35, and the keyboard 20 will retransmit its packet 2 ms after that and receive an ACK packet 35.

In addition to collisions, other interferences may cause a keyboard packet 25 or a mouse packet 15 not to be received correctly and, therefore, no ACK packet 35 to be sent by the receiver 30. Interferences may also interfere with the ACK packet 35 and, therefore, cause it to not be received correctly by the keyboard 20 or the mouse 10. For these reasons, DSSS may be used to provide significant immunity to interfering signals. However, DSSS will not completely prevent strong RF signal sources from interfering with the system, for example, when an 802.11 wireless network is located near the keyboard and mouse system 100.

In some cases, such interference may cause the receiver 30 to receive packets 15, 25 with a high bit error rate. In other cases, the receiver 30 may not receive the packets 15, 25 at all. To address the possibility of this second case, the receiver 30 periodically measures the RF signal strength on the channel in use using a Received Signal Strength Indicator (RSSI) circuit. If the receiver 30 detects persistent high signal strength but is not receiving even corrupted keyboard or mouse packets, then the receiver 30 will infer the presence of a strong interferer on the channel in use, find a clear channel, and change to use the clear channel.

Figure 2A:
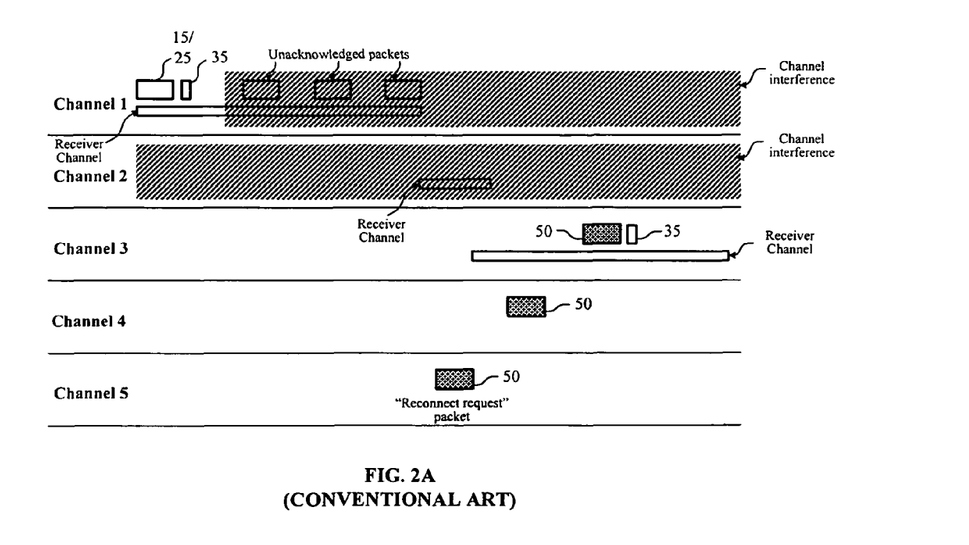
FIG. 2A is a simplified timing diagram of the wireless keyboard and mouse system of FIG. 1 using a conventional means of frequency agility.

FIG. 2A is a simplified timing diagram of the wireless keyboard and mouse system 100 of FIG. 1 using a conventional implementation of frequency agility. For example, the keyboard and mouse system initially may be operating on Channel 1. When the receiver 30 detects high RSSI without any received packets for a certain duration (for example, 10 ms) or the receiver 30 receives a certain number of (for example, 5) consecutive corrupted packets, the receiver 30 infers that Channel 1 has "gone bad" and begins executions of a new channel selection algorithm.

Similarly, when the keyboard 20 or the mouse 10 fails to receive ACK packets 35 for a certain number of (for example, 5) consecutive data packets, the keyboard 20 or the mouse 10 infers that Channel 1 has "gone bad" and will begin execution of a reconnection algorithm.

The new channel selection algorithm cycles through alternative channels in a pre-defined order looking for a channel with low RSSI. When a clear channel—for example, Channel 3—is found, the receiver 30 transmits a "ping" packet to see if another keyboard and mouse system is operating on the same channel. If there is no response to the "ping" packet, the receiver determines that the channel is available and selects Channel 3 as the new channel.

The reconnection algorithm cycles through alternative channels in a pre-defined order, transmitting "reconnect request" packets 50 from the keyboard 20 or the mouse 10. When the receiver 30 receives a reconnect request packet 50 on its newly selected channel, the receiver 30 sends back an ACK packet 35, and the system 100 can begin operating as normal on the new channel.

The whole process of finding and switching to a clear channel in the keyboard and mouse system 100 of FIG. 1 using a conventional implementation of frequency agility (as in FIG. 2) may take as little as 20 ms or as long as 100 ms or more from the time of the first "lost" packet to the first good packet received on the new channel, depending on how many channels the receiver has to test before finding an open channel. A 20 ms delay between moving a mouse and the movement being reflected on the computer will be barely, if at all, perceptible. However, a 100 ms delay would be clearly perceptible to the user, appearing as a "jerky" mouse pointer motion. In other systems, such as a wireless audio application, a gap of as little as 20 ms may be very noticeable to the user.

Figure 2B:
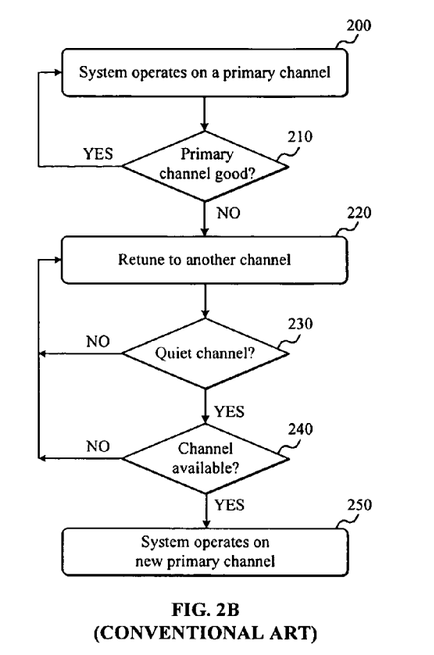
FIG. 2B is a flowchart of a conventional method of frequency agility.

FIG. 2B is a flowchart of the conventional method of frequency agility. In step 200, the wireless keyboard and mouse system 100 of FIG. 1 operates on a primary channel. When the primary channel goes bad in step 210, the system 100 begins to search for a clear channel. In step 220, the system 100 retunes to another channel and, in step 230, determines whether the channel has low RSSI. The system 100 cycles through alternative channels until a clear channel is found. In step 240, the system 100 determines whether the clear channel found is available. If available, the system 100 selects the clear channel as the new primary channel in step 250. Otherwise, the system 100 returns to step 220 to search of a clear channel that is available.

Embodiments of an improved method of frequency agility will now be described using a frequency agile 2.4 GHz Direct Sequence Spread Spectrum (DSSS) wireless mouse and keyboard system implementation as an example. It will be evident to those skilled in the art that embodiments of the invention are equally applicable to TDMA, CSMA, and any other frequency agile system operating in any frequency band.

Referring back to FIG. 1, interference in the wireless keyboard and mouse system 100 may be avoided by using unused bandwidth to periodically evaluate the level of interference on currently unused channels. Therefore, if and when interference on the current channel reaches an unacceptable level, the keyboard and mouse system 100 can immediately switch to a "pre-verified" alternate channel with minimal delay.

Figure 3A:
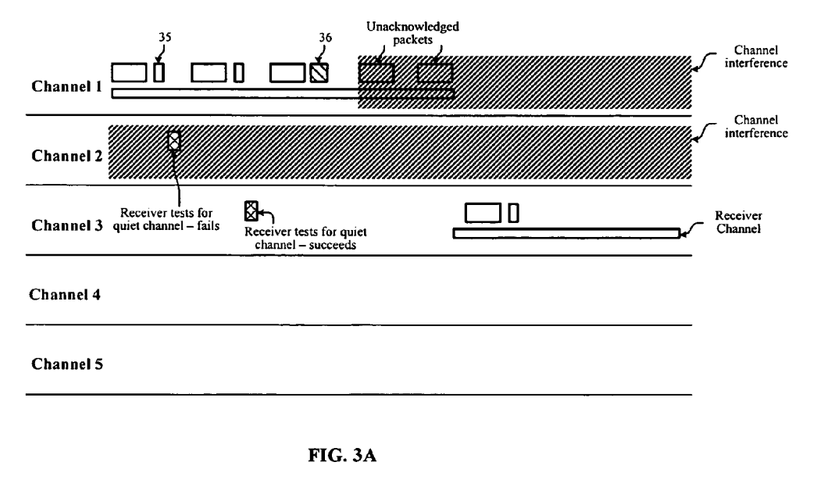
FIG. 3A is a simplified timing diagram of the wireless keyboard and mouse system of FIG. 1 using an improved method of frequency agility according to a first embodiment illustrating principles of the invention.

FIG. 3A shows a simplified timing diagram of the keyboard and mouse system 100 of FIG. 1 employing improved frequency agility. Referring now to FIGS. 1 and 3, in the keyboard and mouse system 100, locating alternate "quiet" channels (secondary channels) may be conducted immediately after a mouse packet 15 has been correctly received and the corresponding handshake transmitted. Conducting the search for a secondary channel after sending the handshake signal is one embodiment used for illustrative purposes only, and other embodiments of the invention may implement other timing schemes. As mentioned above, if the mouse 10 sends a packet 15 but does not receive an ACK packet 35 in response, the mouse 10 retransmits the original packet 15 after a short delay. Thus, the receiver 30 knows that even if the mouse 10 did not receive the ACK packet 35, there will be a delay (in this example, 1 ms) before the mouse 10 retransmits. During the interval after the transmission of an ACK packet 35 to a mouse packet 15, the receiver 30 retunes to another channel and measures the RSSI. As shown in FIG. 3A, for example, after transmitting the ACK packet 35 on Channel 1, the receiver 30 retunes to Channel 2, tests the channel, and detects interference. The receiver 30 then retunes back to the current channel (the primary channel) before the end of the minimum retransmission delay for mouse packets 15.

In one embodiment, the receiver 30 preferably continues to check other channels after each mouse packet 15 is received until it finds a quiet channel. This quiet channel may then be designated as the backup or secondary channel. After finding the secondary channel (Channel 3, for example), the receiver 30 then preferably keeps going back to check that the secondary channel remains quiet after each mouse packet 15 is received. In another embodiment, two or more alternate quiet channels may be located and monitored. These channels may be designated as the secondary, tertiary, etc., channels.

After a certain amount of time without mouse packets 15, the receiver would switch to monitoring the secondary, tertiary, etc., channels, after receiving a keyboard packet 25. Similarly, after a period with no packets received at all (and low RSSI on the primary Channel), the receiver 30 would begin periodically checking the secondary, tertiary, etc., channels on a low duty cycle—for example, once every 100 ms.

When the receiver 30 initially selects a secondary (or tertiary, etc.) channel, the receiver 30 communicates this channel to the mouse 10 and keyboard 20 the next time it receives a mouse or keyboard packet 15, 25 by sending a data packet 36 to the mouse 10 or the keyboard 20. The data packet 36 may be sent either in addition to or in place of the usual ACK packet 35. Because this data packet 36 is only transmitted in response to a correctly received mouse or keyboard data packet 15, 25, the mouse 10 or keyboard 20 will infer that the mouse or keyboard packet 15, 25 was correctly received and store the secondary (tertiary, etc.) channel in local memory. The same procedure may be followed if the secondary channel is detected as going bad and a new secondary channel is selected.

Thereafter, when the primary channel goes bad, the receiver 30 will immediately change to the secondary (tertiary, etc.) channel, as will the mouse 10 and keyboard 20. Because the time required to find a new quiet channel has been eliminated, it is possible to reduce the time before changing channels—for example, to 3 consecutive unacknowledged packets or 5 ms of detected high RSSI. That is, because a secondary channel has already been located and identified, there is little or no delay in switching to the alternate channel when the primary channel goes bad. In the conventional solution, the system does not locate and identify a secondary channel until the primary channel goes bad, thereby resulting in a longer delay before the system switches to the secondary channel. Thus, this embodiment of the invention improves the performance of the system 100 by greatly reducing the length of the interruption of service when the radio channel in use becomes subject to interference.

Figure 3B:
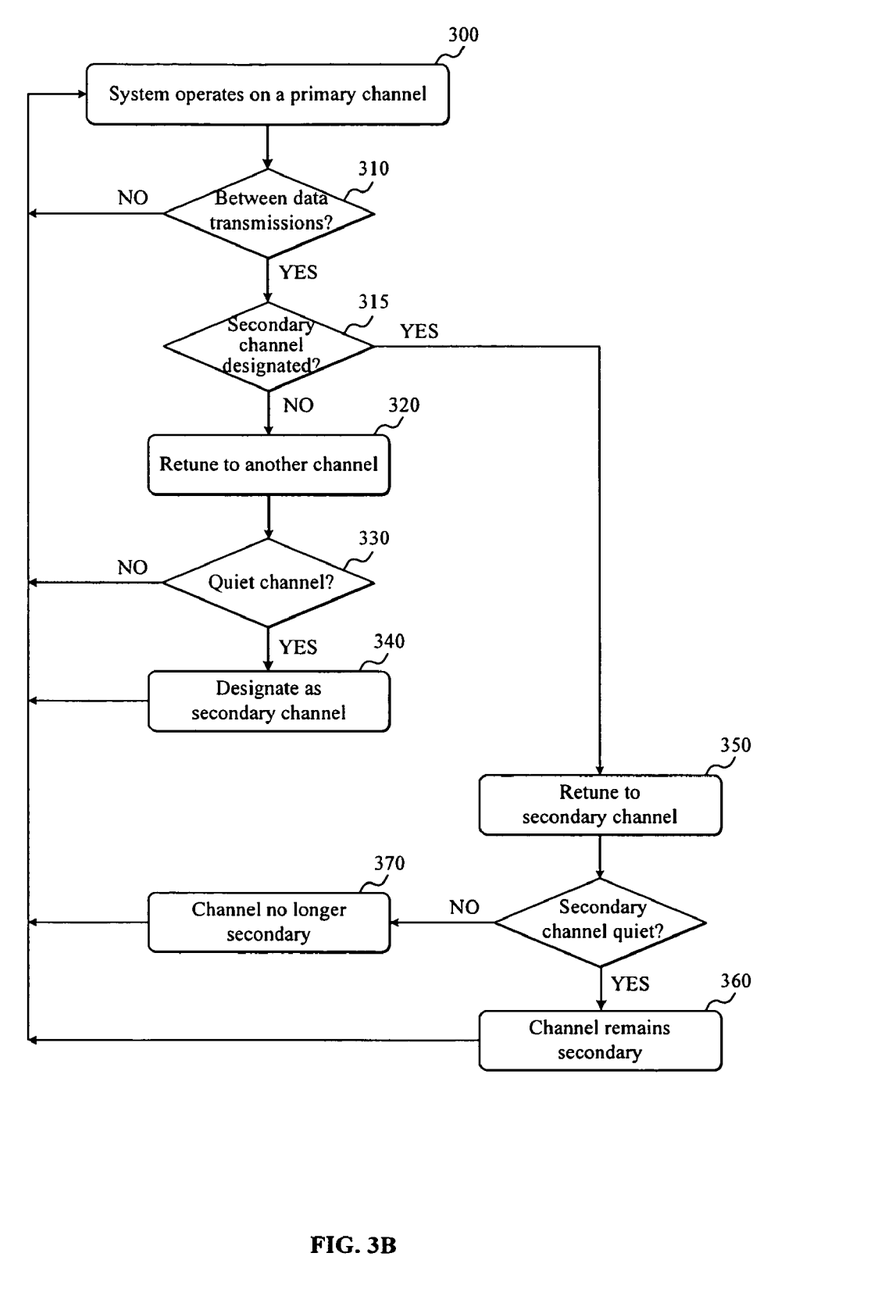
FIG. 3B is a flowchart of the improved method of frequency agility of FIG. 3A.

FIG. 3B is a flowchart illustrating this improved method of frequency agility. Referring to FIG. 3B, in step 300, the system 100 operates on a primary channel. In step 310, the system 100 preferably uses the time delay between data transmissions to search for a clear channel. In step 320, during the time delay, the system 100 retunes to another channel and, in step 330, determines whether that channel has low RSSI. If the channel is not quiet, the system 100 retunes back to the primary channel and continues to use the time delay between data transmissions to cycle through alternative channels until a clear channel is found. If the alternate channel is quiet, the system 100 preferably designates that channel as the secondary channel in step 340 and retunes back to the primary channel. In step 315, when the secondary channel has already been designated, the system 100 preferably uses the time delay between data transmissions to monitor the secondary channel. To do this, in step 350, the system 100 retunes to the secondary channel. If the secondary channel remains quiet, then the channel remains as the designated secondary channel in step 360 and the system 100 continues to use the time delay between data transmissions to monitor the secondary channel. Otherwise, in step 370, the channel is no longer designated as the secondary channel and the system 100 uses the time delay between data transmissions to find a different secondary channel.

The embodiment of the invention described above in FIGS. 3A and 3B related to a keyboard and mouse system 100 in which the overall throughput of the system is low compared with the available bandwidth (a little over 10%). The practical limit for such systems is typically reached when the desired throughput approaches 30% of available bandwidth.

In systems where higher throughput is required, TDMA may be a more suitable approach. Embodiments of the improved method of frequency agility described above may be equally applied to TDMA systems. In one example, a game controller system may require that four gamepads be supported, each gamepad requiring around 1 ms to transmit data packets, every 10 ms. In one TDMA implementation, each gamepad may be allocated a 2 ms time slice every 10 ms. The receiver transmits a brief "poll" packet at the beginning of each time slice, and each gamepad only responds to its own unique poll packet. The improved method of frequency agility as described above may be applied essentially unmodified to such a TDMA system. However, because there is much less time available for retransmissions (only one transmission and one retransmission in each time slice), it will take longer for all of the devices in the system to realize that the current channel has gone bad. This may, therefore, in some instances, introduce unacceptable periods of loss of service.

Figure 4A:
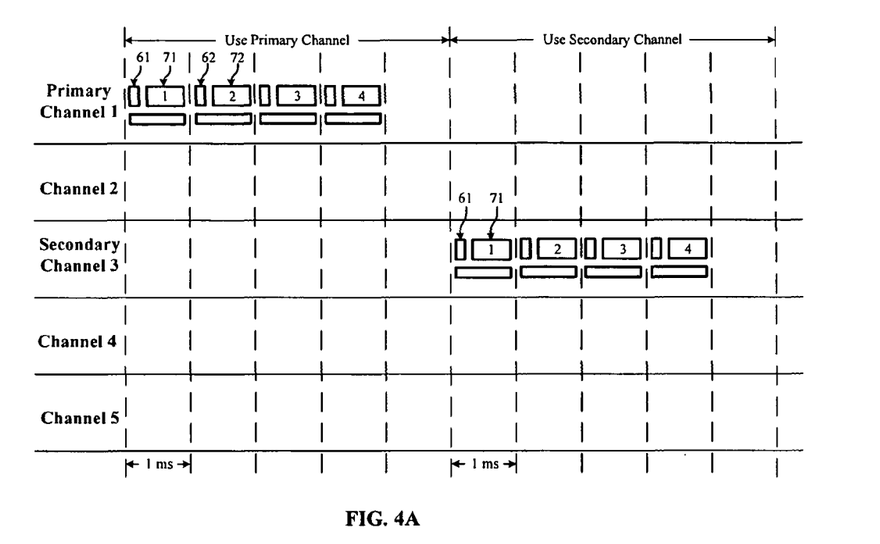
FIG. 4A is a simplified timing diagram of a TDMA system using another embodiment of an improved frequency agility method according to further principles of the invention.

FIG. 4A is a simplified timing diagram illustrating another embodiment of the improved method of frequency agility. In this embodiment of the invention, which comprises a hybrid of frequency hopping and frequency agility, the TDMA system preferably uses both a primary and a secondary channel on a continuous basis. For example, in the gamepad controller system described above, the 10 ms update interval may be split into two 5 ms periods. During the first 5 ms, the primary channel (for example, Channel 1) can be used; during the second 5 ms, the secondary channel (for example, Channel 3) can be used.

At the beginning of the update interval, the receiver preferably issues a poll packet 61 on the primary channel to the first gamepad, which will transmit data packet 71 in response. One ms later, the receiver will preferably issue a poll packet 62 on the primary channel to the second gamepad, which will transmit data packet 72 in response, and so on for all four gamepads. Five ms after the beginning of the update interval, the receiver preferably issues a poll packet 61 on the secondary channel to the first gamepad, which will, in response, transmit the same data packet 71 as it did 5 ms earlier on the primary channel. This is then repeated for the other gamepads. In another embodiment, the receiver may poll the gamepads on the secondary channel only if the data packet response on the primary channel was not correctly received.

Figure 4B:
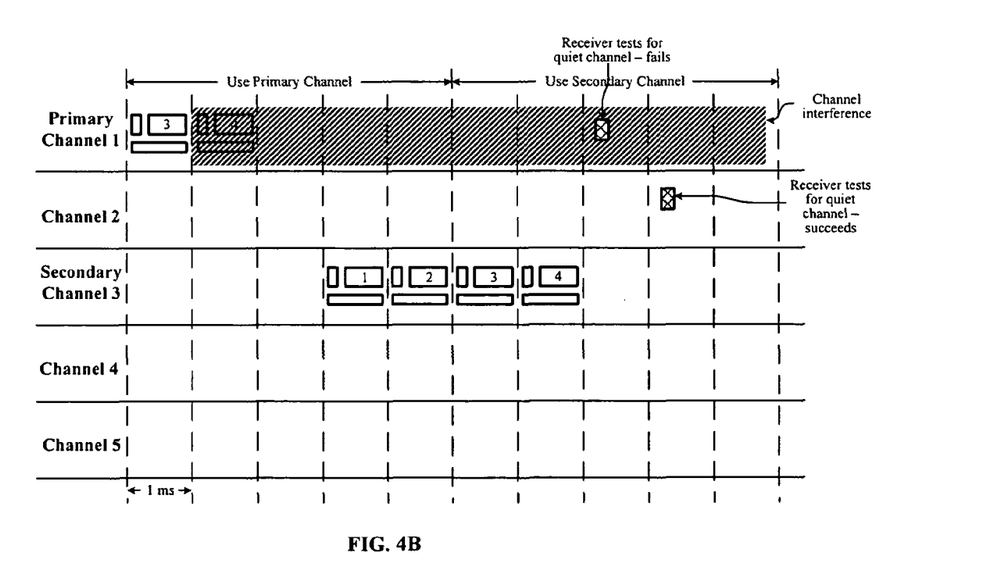
FIG. 4B is a simplified timing diagram illustrating the operation of the TDMA system described in FIG. 4A when one of the channels goes bad.

Referring now to FIG. 4B, if either the primary or the secondary channel goes bad, then the data link between the gamepads and receiver is maintained using the other channel. When this happens, 5 ms out of each 10 ms update interval is preferably used to find a new channel using a same method similar to that described previously in the keyboard and mouse system. For example, when the primary channel (Channel 1) goes bad, the secondary channel (Channel 3) becomes the new primary channel, and the receiver tests the other channels to find a new secondary channel. Thus, interruption of service can be eliminated when either the primary or secondary channel goes bad.

Figure 4C:
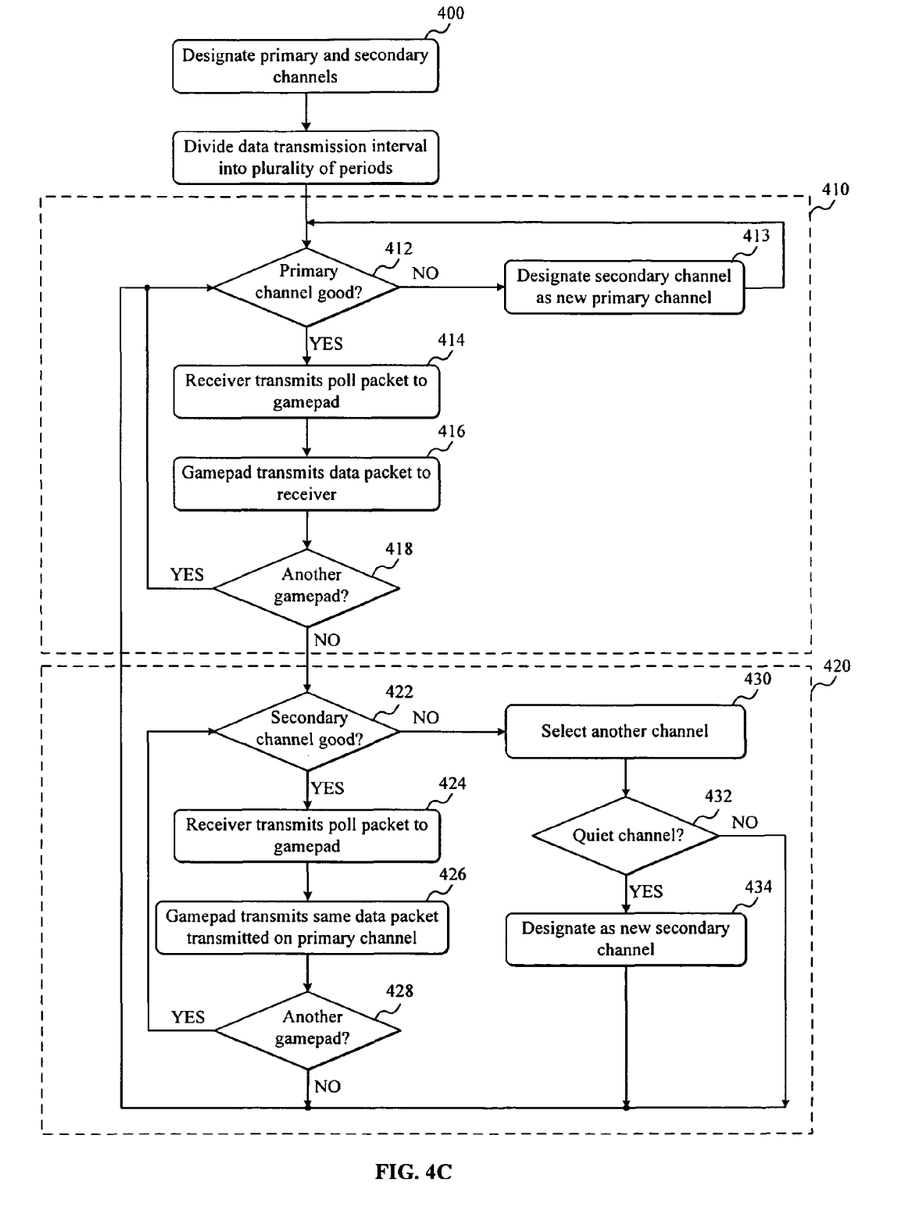
FIG. 4C is a flowchart of the improved method of frequency agility of FIGS. 4A and 4B.

FIG. 4C is a flowchart of the improved method of frequency agility combined with frequency hopping, as illustrated in FIGS. 4A and 4B. In step 400, the system 100 designates both primary and secondary channels. The system 100 preferably divides the data transmission interval into a plurality of time periods, for example, first period 410 and second period 420. The system 100 then preferably operates on the primary channel during the first period 410 and on the secondary channel during the second period 420. During the first period 410, if the primary channel remains quiet in step 412, the receiver transmits a poll packet to a gamepad in step 414. In response to the poll packet, the gamepad transmits a data packet to the receiver in step 416. The system 100 preferably cycles through all of the gamepads and repeats the process on the secondary channel during the second period 420. During the second period 420, if the secondary channel remains quiet in step 422, the receiver transmits a poll packet to a gamepad in step 424. In response to the poll packet, the gamepad transmits the same data packet transmitted to the receiver in the first period in step 426. The system 100 cycles through all of the gamepads and retunes back to the primary channel at the end of the second period 420.

In step 412, if the primary channel goes bad, the system 100 retunes to the secondary channel in step 413. The secondary channel then becomes the new primary channel. The system 100 then maintains operations with the new primary channel and uses the second period 420 to find another secondary channel. In step 430, the system 100 selects another channel. If the selected channel is quiet, then the system 100 designates that channel as the new secondary channel in step 434 and returns to operating on both primary and secondary channels. Otherwise, the system 100 preferably maintains operation on the primary channel during one period and continues to search for another secondary channel during the other period.

It should be appreciated that reference throughout this specification to "one embodiment" or "an embodiment" means that a particular feature, structure, or characteristic described in connection with the embodiment may be included in at least one embodiment of the invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined or separated as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, having described exemplary embodiments of the invention, it is noted that modifications and variations can be made by persons skilled in the art in light of the above teachings. Therefore, it is to be understood that changes may be made to embodiments of the invention disclosed that are nevertheless still within the scope and the spirit of the invention.

What is claimed is:

1. A method, comprising:
    transmitting data directly between a first endpoint device and a second endpoint device on a primary channel;
    identifying, with the first endpoint device, a second channel free from having an acceptable level of interference to exchange data between the first endpoint device and the second endpoint device;
    in response to determining that the data transmitted on the primary channel is not received, retransmitting the data on the secondary channel directly between the first endpoint device and the second endpoint device when an unacceptable level of interference is detected on the primary channel:
receiving a data packet on the primary channel from the second endpoint device; and
responding to the received data packet with another data packet that includes a frequency associated with the secondary channel, wherein the second endpoint device is configured to store the frequency associated with the secondary channel and continue to exchange data over the primary channel with the first endpoint device.

2. The method of claim 1, wherein identifying the secondary channel comprises:
retuning to a separate channel between data transmissions on the primary channel, wherein the first and second endpoint devices are configured to exchange data over the separate channel;
determining a level of interference on the separate channel; and
designating the separate channel as the secondary channel if the level of interference is acceptable.

3. The method of claim 1 further comprising:
storing the frequency of the secondary channel in memory.

4. The method of claim 1, further comprising:
monitoring the secondary channel for interference between data transmission on the primary channel.

5. The method according to claim 1, wherein Direct Sequence Spread Spectrum (DSSS) modulation is used to transmit and receive data.

6. The method according to claim 1, wherein the level of interference is determined according to a strength of radio frequency (RF) energy on the channel when no data is being received.

7. The method according to claim 1, wherein the level of interference is determined according to a Bit Error Rate (BER) in the received data.

8. A method, comprising:
selecting primary and secondary channels substantially free from interference;
transmitting data packets on the primary channel during a first period of a data transmission interval;
re-transmitting the same data packets on the secondary channel during a second period of the data transmission interval; and
identifying another channel during the first period of the data transmission interval when an unacceptable level of interference is detected on the primary channel or during the second period of the data transmission interval when an unacceptable level of interference is detected on the secondary channel.

9. The method of claim 8, further comprising:
maintaining operations on one of the primary or secondary channels during one of the periods of the data transmission interval when the unacceptable level of interference is detected on the other one of the primary or secondary channels.

10. The method of claim 9, wherein maintaining operations on one of the primary or secondary channels comprises:
detecting the unacceptable level of interference on one of the primary or secondary channels; and
continuing to send and receive data on the channel without substantial interference.

11. The method of claim 9, wherein finding another channel free from interference comprises:
retuning to an alternate channel;
determining a level of interference on the alternate channel; and
selecting the alternate channel as a new primary or secondary channel if the level of interference on the alternate channel is acceptable.

12. The method of claim 9, wherein the level of interference is determined according to a received signal strength of a data signal.

13. The method of claim 9, wherein the level of interference is determined according to a Bit Error Rate (BER) of a data signal.

14. A wireless system, comprising:
a transmitter configured to transmit data to a receiver on a primary channel;
a channel selector configured to find a secondary channel between data transmissions on the primary channel, wherein the transmitter and receiver are configured to switch to transmitting and receiving data on the secondary channel when an unacceptable level of interference is detected on the primary channel, and wherein the transmitter is further configured to retransmit on the secondary channel the data transmitted on the primary channel in response to determining that the data transmitted on the primary channel was not received, and wherein the transmitter is further configured to respond to a data packet received from the receiver with another data packet that identifies a frequency associated with the secondary channel, wherein the receiver is configured to store the frequency associated with the secondary channel and continue to exchange data over the primary channel with the transmitter.

15. The system according to claim 14, further comprising:
a processing element configured to determine a level of interference on the channels.

16. The system according to claim 15, wherein the level of interference is determined according to a received signal strength of a data signal.

17. The method according to claim 15, wherein the level of interference is determined according to a Bit Error Rate (BER) of a data signal.

18. The system according to claim 14, wherein Direct Sequence Spread Spectrum modulation is used to transmit and receive the data.

* * * * *